United States Patent [19]

Newell, III et al.

[11] Patent Number: 4,638,850
[45] Date of Patent: Jan. 27, 1987

[54] ELECTRONIC THERMOSTAT

[75] Inventors: Alfred T. Newell, III, Birmingham, Ala.; E. Lane Nichols, Clearwater, Fla.

[73] Assignee: A. T. Newell Co. Inc., Birmingham, Ala.

[21] Appl. No.: 683,009

[22] Filed: Dec. 18, 1984

Related U.S. Application Data

[62] Division of Ser. No. 584,398, Feb. 28, 1984.

[51] Int. Cl.$^4$ .............................................. F25B 29/00
[52] U.S. Cl. .................................... 165/26; 236/78 R
[58] Field of Search ............. 236/78 R, 78 D; 165/26, 165/27; 374/179, 183; 340/588; 307/39; 219/486

[56] References Cited

U.S. PATENT DOCUMENTS

| | | | |
|---|---|---|---|
| 3,535,561 | 10/1970 | Pinckaers | 165/26 X |
| 3,815,815 | 6/1974 | Sapir | 165/26 X |
| 3,887,000 | 6/1975 | Pinckaers | 165/26 |
| 4,090,062 | 5/1978 | Phillips et al. | 219/486 |

Primary Examiner—William E. Wayner
Attorney, Agent, or Firm—James W. Potthast

[57] ABSTRACT

An electronic thermostat for controlling multiple temperature altering apparatus of an animal enclosure or the like. A voltage divider to produce a plurality of temperature sensor signals which are used to produce primary or override actuation signals. The set temperature signal is selectable between two set point limits which are selectively variable to calibrate different scales. A plurality of detectors respectively compare the plurality of sensor signals with a common set temperature reference signal to produce a plurality of detection signals at a plurality of preselected temperatures associated therewith. The preselected temperatures at which a first heat control detection signal is produced is different from the preselected temperature of which the first cool control detection signal is produced, so that a dead zone between cycles is created. Primary detectors in both the cooling and heating stages cause actuation of associated cooling and heating apparatus, respectively, only if the detection signal is maintained for a preselected time period to prevent shortcycling. Override detectors, on the other hand, cause actuation of the same apparatus within a shorter override time period if the temperature associated therewith is achieved before actuation in response to the primary detector. Alternately or additionally, the override detectors actuate additional temperature altering apparatus or independently cause actuation of the same apparatus associated with the primary detector.

5 Claims, 5 Drawing Figures

ELECTRONIC THERMOSTAT

This application is a division of application Ser. No. 06/584,398, filed 2/28/84.

BACKGROUND OF THE INVENTION

This invention relates generally to a thermostat and, more particularly, to an electronic thermostat for controlling multiple temperature altering devices.

Thermostats are well known which sense temperature, compare the temperature to a preselected temperature reference and then produce an actuation signal in accordance with the comparison to control the application of power to temperature altering devices.

In some applications, such as in controlling the temperature in a hen house or hog house or other animal enclosure, it is of the utmost importance to very closely control the temperature within a narrow range around a set temperature. Accordingly, it is sometimes necessary to control multiple temperature altering devices, some or all of which are cooling devices or heating devices or a combination of both. For the same reasons, it is important to have accurate and fast temperature sensing and accurate calibration and reliable actuation of the temperature altering devices. at Practical considerations also require that the thermostat not cause the temperature altering devices to be short cycled, i.e., to be rapidly turned on and off, any more than necessary, since such short cycling causes damage to electric motors and the like and increases the wear rate on other parts. For like reasons, it is desired to prevent reapplication of power to such devices immediately after temporary power loss when power voltages may still be below rated voltages for such devices.

Various thermostat designs have been proposed to meet some of these needs, but none of them seem to be completely satisfactory in all respects. For instance, in U.S. Pat. No. 4,313,308 of Boratgis et al., a thermostat is shown which has detectors for actuating two cooling or two heating devices at different preselected temperatures, but no means are provided for back-up or override actuation of any one of the heating or cooling devices to improve reliability. Likewise, in U.S. Pat. No. 4,356,962 of Levine, a dead zone generator is provided to establish a hysteresis in the on/off characteristic of the actuation signal, but no means are provided for creation of a dead zone between stages or cycles. In U.S. Pat. No. 4,314,665 of Levine, a dead zone between heating and cooling cycles is provided, but again no means for override actuation is provided. Other electronic thermostats similar to these are also shown in U.S. Pat. Nos. 3,815,815 of Sapir and 4,240,077 of Huges et al.

SUMMARY OF THE INVENTION

It is therefore a general objective of the present invention to provide an electronic thermostat which overcomes many of the problems and disadvantages of known electronic thermostats while providing greater reliability, finer temperature control and improved versatility.

Thus, an important object of the present invention is to provide an electronic thermostat having means for sensing temperature, primary means for actuating a temperature altering apparatus in the event the sensed temperature reaches a set temperature and override means for actuating the same apparatus in the event the sensed temperature reaches an override temperature which is different from said set temperature by a preselected temperature increment. Reliability is improved, since if the primary means fails, the override means can function to actuate the apparatus. Finer temperature control is achieved, for wide temperature fluctuations resulting from failure of the primary actuating means is minimized. In a preferred embodiment, an actuation signal is generated by the primary means only after a preselected time period of actuation temperature detection, and this time period is substantially shortened if the override temperature is reached before the primary time delay is completed.

Another object of the present invention is provision of an electronic thermostat with a temperature sensor of relatively greater accuracy including a current source that produces a current which varies in substantially direct linear proportion with changes in its temperature in combination with means including a sensor voltage divider for producing a sensor voltage having a magnitude which varies in direct proportion to the current and means responsive to the sensor voltage for producing a detection signal when the sensor voltage achieves a preselected reference voltage. Means are also provided for actuating a temperature altering device in response to the detection signal. The linearity of the sensor enables use of relatively inexpensive linearly calibrated set point scales and accuracy is also thereby facilitated. In a preferred embodiment, the voltage divider has a plurality of taps to produce an associated plurality of voltage sensor signals which vary proportionately with changes in temperature to improve versatility.

Yet another objective is to provide an electronic thermostat for controlling both cooling and heating devices which have both a hysteresis characteristic in the actuation and de-actuation of individual devices and also a dead zone between heating and cooling cycles. This minimizes short cycling and simultaneous action of heating and cooling devices at the same time and the waste associated therewith. Reduction of risk of rapid cycling also enables tighter control of the temperature. In a preferred embodiment, the electronic thermostat includes means for sensing the temperature, means for controlling the heating apparatus in response to the temperature sensing means and means for controlling the cooling apparatus in response to the temperature sensing means. The heating apparatus controlling means includes means for actuating the heating apparatus in response to the sensed temperature decreasing to a preselected set temperature and means for de-actuating the heating apparatus in response to the sensed temperature rising to a heat de-actuation temperature slightly greater than the set temperature to establish a hysteresis characteristic in the actuation/de-actuation of the heating apparatus. The cooling apparatus controlling means includes means for actuating the cooling apparatus in response to the sensed temperature rising to a cool actuation temperature greater than the heat de-actuation temperature to establish a preselected dead zone between heating and cooling cycles. It also includes means for de-actuating the cooling apparatus when the sensed temperature decreases to a preselected cool de-actuation temperature which is less than the cool actuation temperature to establish a hysteresis characteristic in the actuation and de-actuation of the cooling apparatus.

Still a further object of the present invention is to provide an electronic thermostat with means for sensing temperature, means for detecting when the sensed temperature reaches the set temperature and means responsive to the detecting means for providing an actuation signal a preselected time period after continuous generation of the detection signal. Response to transients or noise signals is minimized, so that resultant short cycling is reduced, and finer temperature control is obtained. In a preferred embodiment, an override means is provided to shorten the time period in the event the temperature exceeds the set point temperature by a preselected override increment.

Still a further object of the present invention is to provide an electronic thermostat comprising means for sensing temperature, means for producing a reference signal representative of a desired set temperature including means for selectively varying the reference signal in a range between two set point limits, means for individually, selectively, varying the set point limit and means for controlling the temperature altering apparatus in accordance with the comparison of the sensed temperature and the set temperature. This double set point limit control facilitates calibration and thereby improves accuracy. In addition, the two set points can be varied to correspond to different linear scales which might be used in different applications to improve versatility.

In keeping with another aspect of the present invention, an electronic thermostat is also provided with means responsive to loss of power when power is being applied to a load to delay reapplication of the power for a preselected time period after power is re-established. This improves the reliability of the system controlled by the thermostat by preventing damage to the load which could result from application of power voltage at below rated voltage.

Yet another object is provision of an electronic thermostat which can control a multiplicity of devices in accordance with different temperature conditions. In keeping with this objective, an electronic thermostat is provided with means for producing a plurality of different sensor signals which vary substantially proportionally with temperature, means for establishing a reference signal, a plurality of detectors responsive to said plurality of sensor signals, respectively, and to said one reference signal for producing a plurality of detection signals at a plurality of sensor temperatures respectively associated therewith, and means responsive to the detection signals for providing actuation signals at said plurality of said sensor temperatures.

A further object is to provide an electronic thermostat with an improved sensor to improve overall accuracy and control. Accordingly, in a preferred embodiment, an electronic thermostat is provided with a probe for developing a sensor signal which varies substantially proportionately with temperature including an elongate tube having a connector end and another end, a sensor, means for mounting the sensor within the tube and means connected to the sensor at the connector end of the tube for producing an actuation signal in response to the sensor signal. Preferably, the tube is painted black, so that the sensor absorbs black body radiation. The tube, in one embodiment, is open at one end and the sensor is located at the other end. In another embodiment which provides faster response, the sensor is held at the end of the tube by means of a suitable thermally conductive cement.

BRIEF DESCRIPTION OF THE DRAWINGS

The foregoing objects, features and advantages of the present invention will be described in greater detail and other objects, features and advantages will be made apparent from the detailed description of the preferred embodiment which is given with reference to the various figures of the drawing, in which.

DETAILED DESCRIPTION

Figure 1:
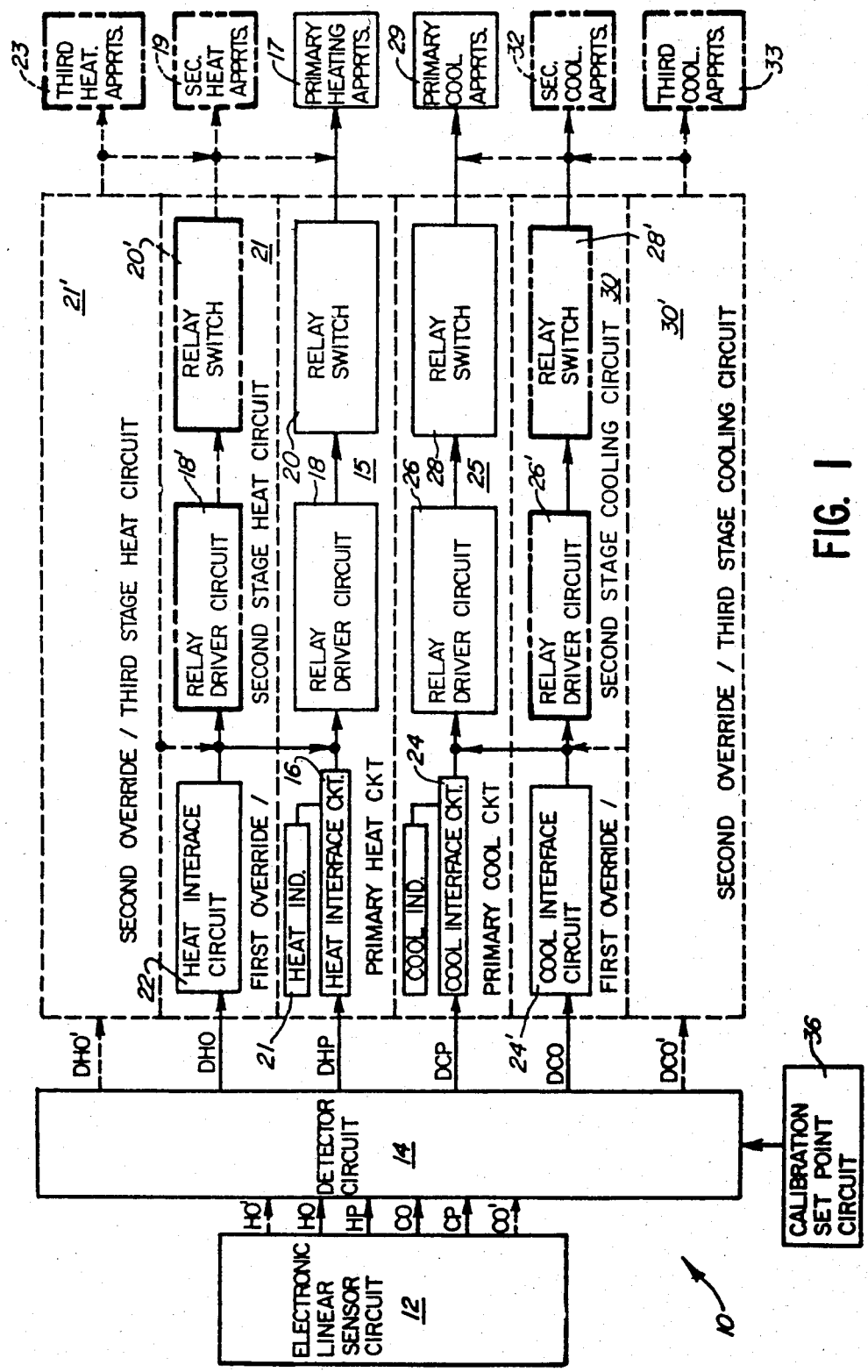
FIG. 1 is block diagram of a preferred embodiment of the electronic thermostat of the present invention.

Referring first to FIG. 1, the preferred embodiment of the electronic thermostat 10 of the present invention includes a unique electronic linear sensor circuit 12. Linear sensor 12 produces four different voltage outputs that vary substantially in direct linear proportion with variations in temperature of the sensor environment over a wide range of temperature as compared to a thermistor. Thermistors, which are known to be used in electronic thermostats, unfortunately produce output signals which vary logarithmically. The temperature calibration and other problems that this logarithmic characteristic causes prior electronic thermostats is overcome with the electronic linear sensor circuit 10. In particular, sensor 12 permits simple and accurate calibration of the thermostat with temperature through use of a linear dial that indicates the temperature setting on a linear scale.

Preferably, four different sensor voltage outputs HO (heat override), HP (heat primary), CP (cool primary) and CO (cool override) are connected to the input of a detector circuit 14. In each case, the detector circuit 14 has four detector stages, or detectors, which produce pulses on four outputs DHO, DHP, DCP and DCO in response to the amplitudes of the associated sensor input voltages of leads HO, HP, CP and CO, respectively, reaching a single preselected reference voltage commonly associated with all of the detectors. Alternately, as indicated in broken line, the sensor produces additional sensor voltage signals on outputs HO' (secondary heat override) and CO' (secondary cool override), which are applied to additional detectors of detector circuit 14 that produce responsive detection signals on outputs DHO' and DCO', respectively. Alternately, fewer or more stages are provided, and the modular design illustrated in FIG. 1 facilitates such flexibility.

The reference voltage is the same for all six detectors for the same temperature setting, while the amplitudes of the four sensor signals on outputs HO', HO, HP, CP, CO and CO' differ from one another by preselected incremental amounts. Accordingly, the detectors generate detection signals at different preselected temperatures. The difference in response temperature for adjacent pairs of detectors may be selected to be the same or to be different depending on the application of the thermostat. For example, an incremental difference of 0.0202 volts between successive detectors at a temperature of 25 degrees Centigrade has been found suitable to the desired result of providing a dead zone of approximatel 1.0 degrees Centigrade between all adjacent stages.

The electronic thermostat has two cycles—a heat cycle and a cool cycle. The heat cycle has three stages—a primary heat stage which is activated when a detection pulse is produced on output DHP, a second, or heat override, stage which is activated when a detection pulse is produced on output DHO, and, if provided, a third, or secondary heat override, stage which is activated when a detection pulse is produced on output DHO'. The detection pulse is produced on output DC, a second, or cool override, stage which is activated when a detection pulse is produced on output DCO, and, if provided, a third, or secondary cool override, stage which is activated when a detection pulse is produced on output DCO'. The pulses are successively produced on outputs DH, DHO and DHO' in response to the temperature decreasing below the set temperature, first by half of the intercycle temperature increment, or dead zone, then by the additional second interstage temperature increment and, finally, by the additional third interstage increment.

For example, presume the set temperature is set at 25 degrees Centigrade and both the heat interstage and intercycle cycle temperature increments have been selected as 1.0 degrees Centigrade. Then when the sensor temperature drops 0.5 degrees Centigrade, or one half of the intercycle temperature increment, to a temperature of 24.5 degrees Centigrade, the amplitude of the temperature sensor signal on lead HP will be equal to the reference temperature signal, and a detection pulse will be produced on detector output DHO. This primary heat detection pulse is coupled through a primary heat circuit, or actuator, 15 to actuate a primary heating apparatus 17.

The detection pulse on output DHP is coupled to a heat interface circuit 16 which initiates a preselected time delay. If the primary heat detection pulse remains extant for the duration of the time delay, then a pulse is generated to actuate a relay driver circuit 18, which in turn actuates a relay switch 20. The relay switch 20 then connects power from a suitable electrical power source (not shown) to the primary heating apparatus 17. A visual heat indicator 21 is also actuated in response to the heat detection pulse applied to heat interface circuit 16.

In the event the temperature continues to fall, either because the actuated primary heating apparatus is inadequate or because of failure of the detector associated with detector output DHP, then the second stage detector will generate an override detection pulse on output DHO when the temperature drops another interstage temperature increment to 23.5 degrees Centigrade, for instance. This heat override detection pulse is coupled to a heat interface circuit 22 of a first override/second stage heat circuit 21. If this heat override detection pulse remains extant for another, preselected override time delay associated with the heat interface circuit 22, the relay driver circuit 19 generates a pulse to actuate relay switch 20 in the event it has not previously been caused to do so in response to a primary heat detection pulse. This circumstance may arise because the primary time delay is greater than the override time delay, which may be as short as zero time.

Alternately or additionally, as indicated by broken lines, the heat override detection pulse is coupled through its own relay driver circuit 18' to an associated override relay switch 20'. Relay switch 20' is employed to energize an auxiliary heating apparatus 19 to assist the primary heating apparatus 17 associated with heat relay switch 20. Additionally or alternately, it is connected to separately actuate primary heating apparatus 17 in the event it has not been previously actuated.

If the temperature still continues to fall, then a second override, or third stage, heat detection pulse is generated on detector output DHO' when the temperature reaches 22.5 degrees Centigrade. This second override pulse is applied to a second override/third stage heat circuit 21' which is substantially identical in structure and operation to the first override/secondary stage heat circuit 21. This second override circuit 21' actuates a separate, tertiary heating apparatus 23. In addition or alternately, it is coupled to one or both of the primary heating apparatus 17 and the secondary heating apparatus 19 for providing backup or override actuation, as indicated by the broken line connections thereto. Also, in addition or alternately, a pulse from its heat interface circuit (not shown) is coupled to one or both of relay driver circuits 18 and 18' to provide override or backup actuation thereto, as indicated by broken line connections thereto.

Thus, it is seen that a multistage electronic thermostat is provided which will provide both internal backup and override functions to make the thermostat less prone to failure and, in addition, to provide successive control for a plurality of heat apparatus. The heating apparatus 17, 19 and 23 may be of various types and can include, in addition to electric or fuel powered heaters, ventilation controllers, fans, or the like which can be employed to alter temperature in a controlled environment.

The cooling cycle has analogous elements and operates substantially the same as the heat cycle circuitry except in reverse with respect to temperature. When the sensed temperature rises above the set temperature by an amount equal to half the intercycle temperature increment, a primary cool pulse is generated on detector output DCP. After a preselected time delay, this pulse is coupled through a cool interface circuit 24 to a relay driver circuit 26 which actuates a cool relay switch 28. The cool relay switch is connectable to control a load, such as a primary cooling apparatus 29. A cool indicator 31 is actuated by the cool detection pulse whenever the thermostat is operating in the cooling cycle to provide a visual indication of same.

The cool cycle, like the heat cycle, has three stages: a primary cool stage 25 associated with sensor output CP and detector circuit output DCP, a first override/second cool circuit stage 30 associated with sensor output CO and detector circuit output DCO, and a second override/third cool stage 31 associated with sensor output CO' and detector circuit output DCO'. Primary cooling circuit 25, the first override/second stage cool circuit 30 and the second override/third stage cool circuit 30' respectively correspond generally in structure and operation to the heat cycle circuits 20, 21 and 21' with respect to actuation of a primary cooling apparatus 29, a senondary cooling apparatus 32 and a tertiary cooling apparatus 33.

If the sensed temperature rises by another interstage temperature increment, a detection pulse is generated on output DCO which is coupled through a cool interface circuit 35 of the first override/second stage cool circuit 30 to relay driver circuit 26 after a preselected override time delay. Alternately, or additionally, the detection pulse is coupled through another relay driver circuit 26' to actuate a relay switch 28' respectively corresponding to relay driver circuit 26 and relay switch 28. Relay switch 28 is connected to a secondary cooling apparatus 32 to connect electrical power thereto. Alternately or additionally, it is connected to the primary cooling apparatus 29.

If the temperature rises by another interstage temperature increment, a second override/third stage cool circuit 30' responds to a detection pulse DCO' to actuate a third cooling apparatus 33, to provide an override pulse to relay driver circuits 26' or 26, and, additionally or alternately, to provide override actuation to either the secondary or primary cooling apparatus 29 and 32.

The temperature is set by means of a calibration/set point circuit 36. Advantageously, since the sensor is linear, the set point scale is linear, and the set point circuit is employed in combination with a simple and effective two point calibration circuit that facilitates simple calibration to different linear scales.

All of the circuits 16, 22, 24 and 35 include time delay circuitry for delaying generation of an output pulse in response to a detection pulse. If the detection pulse is not maintained throughout the time delay period, then the resultant output pulse will be aborted. A time delay of fifteen seconds has been found a satisfactory delay time for the primary circuits 16 and 24 while a delay time of three seconds is preferred for the override circuits 22 and 35. The time delays minimize undesirable rapid cycling due to temperature transients or otherwise.

In addition to performing the override function described above, the override circuits advantageously protect motor loads or the like connected to the relay switches 20 or 28 from "instant on" actuation after momentary loss of power. In the event of loss of power, means are provided for instantly resetting the time delay, such that power will not be coupled to the cooling or heating apparatus until sufficient time has passed for power to come up to full voltage. Damage to motors caused by reapplication of power when voltage is below rated voltage is thereby avoided and reliability further enhanced.

Figure 2:
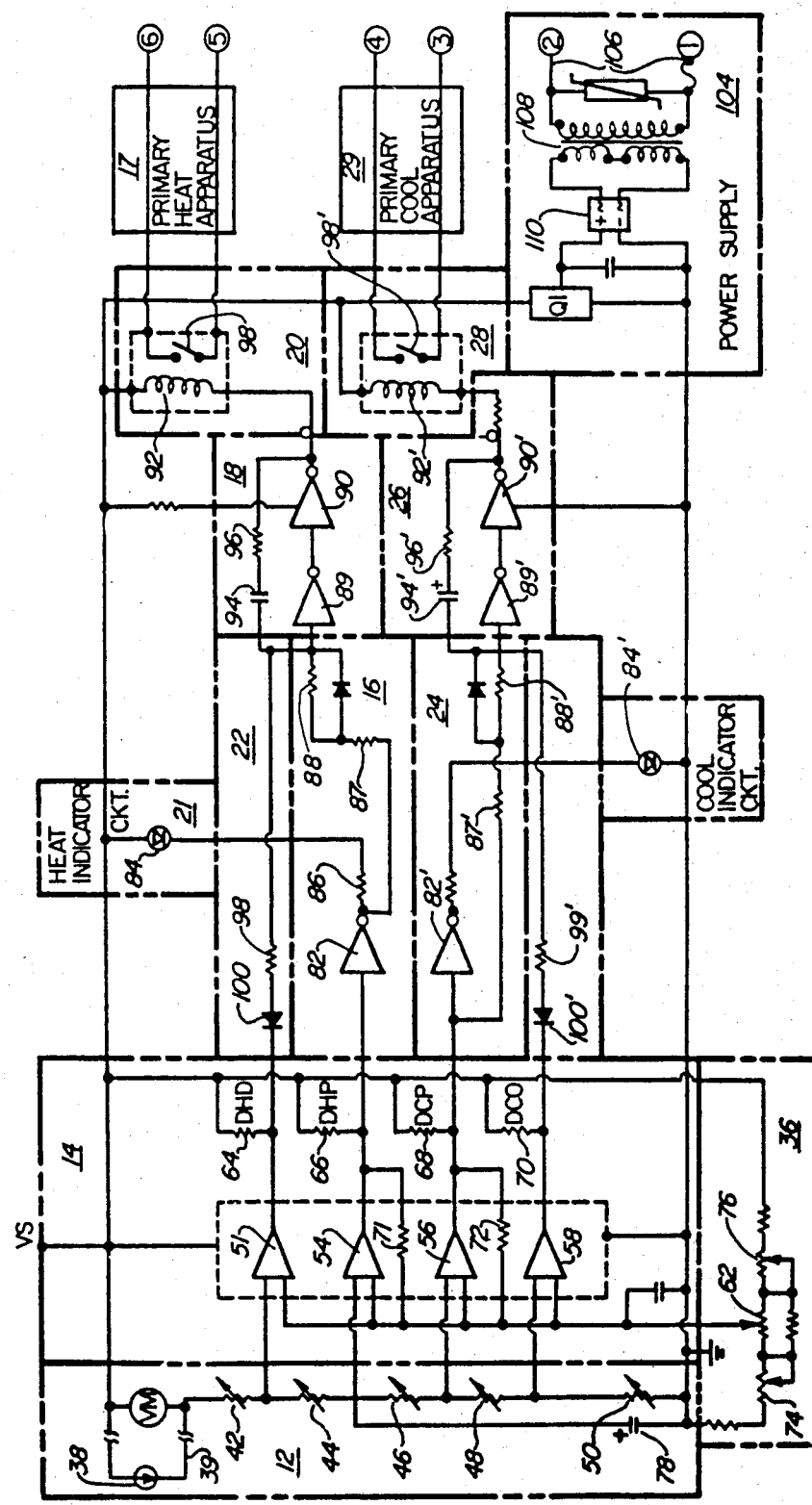
FIG. 2 is a schematic diagram of preferred circuitry for implementing the functional blocks of the electronic thermostat of FIG. 1.

Referring now to FIG. 2, a schematic wiring diagram of a preferred circuit for implementing the functional blocks of FIG. 1 is described. For purposes of simplicity, the second override circuits 21' and 30', the relay driver circuits 18' and 26' and the relay switches 20' and 28' will not be shown further or described. It should be understood that these elements operate in the same or similar manner as their counterparts which are identified herein and will be further described below.

The sensor circuit 12 primarily includes a sensor element 38 remotely connected in series between a regulated supply of D.C. voltage VS, at a magnitude such as twelve volts D.C., and a reference potential, such as ground, to form a current source. The connection of this circuit to ground is through a plurality of series resistors 42, 44, 46, 48 and 50 that form a voltage divider. The magnitude of the current through resistors varies in direct proportion with variations of temperature of the sensor element 38. Preferably sensor element 38 comprises a two terminal, integrated circuit, linear temperature-current transducer having a linear absolute temperature characteristic, such as transducer AD, manufactured by Analog Devices of Norwood, Mass.

The resistors 42, 44, 46, 48 and 50 form a voltage divider having four outputs HO (heat override), HP (heat primary), CP (cool primary) and CO (cool override) which are connected between resistor pairs 42 and 44, 44 and 46, 46 and 48, and 48 and 50. Sensor voltage signals are produced on these sensor outputs which vary linearly with changes in current of the sensor circuit source 38 and thus linearly vary with changes of the sensed temperature. The sensor element 38 is preferably located remotely from the remainder of the sensor circuit 12 and connected thereto by means of an elongate coaxial cable 39 or the like. With this remote connection, accuracy is improved. The sensor circuitry is preferably located in a different, stabler thermal environment than the sensor element 38 so as not to be effected thereby. Likewise, effects on the sensor element 38 of heat from the sensor circuitry is avoided to obtain improved accuracy and reliability.

The magnitudes of the voltages are different from one another by a proportional amount dependent upon the relative magnitudes of the resistors. In the preferred embodiment, resistors 42, 44, 46 and 48 have a preselected value of one hundred ohms and resistor 50 has a preselected value of twenty kilohms. With a high output current sensor, this results in a voltage difference between successive stages of 0.0202 volts at 25 degrees Centigrade. This represents an interstage or intercycle temperature increment of 1.0 degrees Centigrade for the calibration scale which was selected. Alternately, one or more of resistors 42, 44, 46, 48 and 50 are variable resistors to permit simple adjustment of dead zones and relative actuation temperatures.

The four sensor outputs HO, HP, CP, CO are respectively coupled to inputs of four detectors, or comparators, circuits 52, 54, 56 and 58. The other inputs of these comparator circuits are all connected together by a lead 60 to the wiper of a set point potentiometer 62 of calibration/set point circuit 36 for establishing a variable reference voltage. Whenever a particular sensor output voltage reaches the reference voltage applied to its associated comparator circuit, the comparator circuit generates a detection pulse to indicate that its associated temperature has been reached. The detector outputs DHO, DHP, DCP and DCO are coupled to the D.C. supply voltage VS through individual pull-up resistors 64, 66, 68 and 70, respectively, so that strong 1-state logic signals are produced on the outputs of the comparator circuit whenever they switch to a logic 1-state.

In keeping with another aspect of the invention, comparator circuits 54 and 56 are provided with positive feedback resistors 71 and 72. The positive feedback creates a hysteresis in the switching characteristics of the comparator circuit such that generation of a detection pulse occurs at a higher temperature for heat cycle comparator 54 and at a lower temperature for cool cycle comparator 56 than the temperature at which the detection pulse is terminated. A ten megaohm resistor has been found suitable to provide a 0.12 Centigrade degree hysteresis differential which is believed sufficient to prevent relay chatter and minimize rapid cycling. In addition, as generally indicated, a dead zone is created between the heating and cooling cycles and between intracycle stages.

Achieving another object of the invention, the set point and calibration circuit includes two set point calibration potentiometers 74 and 76 to provide two point calibration. Potentiometer 76 is used to set the upper end of the set point voltage to correspond to the upper limit of the temperature scale, such as one hundred degrees Centigrade, and potentiometer 74 is used to set the lower end of the set point voltage to correspond to the lower limit of the temperature set point scale, such as zero degrees Centigrade. The signal produced on output HP is preferably used as the sensor output for calibration purposes. A capacitor 78 connected to sensor output HP and a capacitor 80 connected to reference voltage lead 60 provide filtering to prevent relay chatter and undesirable switching oscillation.

The remaining circuitry is best described with reference to the various stages of operation. Presume that the set point potentiometer 62 is set to establish a reference voltage corresponding to 25 degrees Centigrade and the sensor is producing a sensor signal representative of 24 degrees Centigrade at sensor output HP. Then the output voltage on output HP will be less than the reference voltage. This condition will cause comparator 54 to switch to a 0-state condition with a 0-state signal on its output DHP equal to zero volts. This 0-state heat detection signal is inverted by an inverter 82 of the relay driver 16 which produces a resultant 1-state signal at its output. This 0-state is also coupled to the remaining time delay portion of the interface circuit 16.

The 1-state detection signal at the output of relay driver circuit 82 is coupled to the heat indicator circuit 13. The heat indicator circuit 13 comprises an LED 84 connected between the negative D.C. supply voltage lead and the output of inverter 82 through a current limiting resistor 86. When the output switches to a 1-state, the LED is caused to light to indicate primary heat is being called for.

The time delay portion of the interface circuit 16 includes a pair of resistors 87 and 88 connected in series between the output of comparator 54 and the input of the first stage amplifier 89 of relay driver circuit 18. The output of amplifier 89 is connected to a second stage amplifier 90, the output of which is connected to one side of a relay coil 92 of heat relay switch 20. The input of amplifier 89 is also coupled to a time delay capacitor 94 which is connected to the positive supply voltage VS.

Before the output of comparator 54 switches to a 0-state, capacitor 94 is charged to the supply voltage VS and thus a 1-state signal is applied to the input of comparator 54, and the relay coil 92 is not energized. However, when the 0-state detection pulse is produced on the output of amplifier 82, the capacitor is discharged through resistors 87 and 88 at a rate dependent upon the values of these components. Preferably, the values are selected so that it takes approximately fifteen seconds for capacitor 94 to discharge to a point where the voltage at the input to amplifier 88 reaches its 0-state threshold. When this happens, amplifier 88 switches its output to a 0-state to actuate relay coil 92. When relay coil is actuated, switch 98 is closed to apply power to the primary heating apparatus 17.

If the pulse does not continue for the time delay period, then the capacitor 94 will be recharged before the input to amplifier 88 reaches a 0-state condition, and the relay coil 92 will not be energized. Thus, false starts due to transient dips in sensed temperatures and rapid cycling are avoided. Rapid cycling is also minimized because of the hysteresis provided by positive feedback resistor 71.

If the temperature continues to fall, then comparator 52 will switch to a 0-state when the temperature drops to the associated heat override temperature. When this happens, capacitor 94 is also discharged through a resistor 98 and a diode 100 of the heat interface circuit 22 at a rate determined in part by the value of resistor 98. Presuming that the principal heat detection pulse on lead DHP was not generated, then the heat override interface circuit 22 will discharge the capacitor in approximately three seconds to the 0-state level or within such other time period as may be selected. If the capacitor is already partially discharged, then the time period will be less. As noted above, with reference to FIG. 1, alternately, or in addition, the heat override interface circuitry is used to drive a separate relay driver circuit 18' to actuate another relay switch 20' which are identical in structure and function as the heat relay driver circuit 18 and the relay switch 20, respectively.

In addition to functioning to couple the override pulse to the relay driver on a time delayed basis, the heat override interface circuit 22 protects motor loads connected to the relay switch 20 from "instant on" activation whenever power is applied. If A.C. power is momentarily lost and then reapplied, the capacitor 94 is quickly recharged through a diode 102 and another delay is required before the capacitor discharges to again energize the relay.

The cool primary interface circuit 24, the cool override interface circuit 30, the cool relay driver circuit 26 and cool relay switch 28 are virtually identical in structure and function as the corresponding circuits of the heat cycle circuitry, the heat primary interface circuit 16, heat override interface circuit 22, heat relay driver circuit 18 and heat relay switch 20, respectively, except as indicated. All corresponding parts operate in substantially the same way except as indicated, and thus the operation will not be described in detail. Corresponding parts have been given the same reference numeral followed by a prime mark. An amplifier 82' generates a 1-state pulse to cause an LED 84' to provide a light indication that a 0-state cool primary detection pulse has been generated on output DCP. At the same time, the 0-state pulse causes a capacitor 94' to discharge through resistors 88' and 87'. A diode 102' is provided to quickly charge capacitor 94' when power is reapplied. The detection pulse is amplified by amplifiers 89' and 90' and applied to a relay coil 92' to close a switch 98' and actuate primary cooling apparatus 29. If the temperature rises to the cool override detection temperature, then a 0-state cool override detection pulse will cause discharge of capacitor 94' through a diode 100' and a resistor 98.

The second override/third stage heat and cool circuits 21' and 30' are constructed substantially the same and operate the same as the first override/second stage heat and cool circuits 21 and 30, respectively.

The cooling apparatus 29, 32 and 33 may comprise any type or combination of devices, including electric or fuel powered cool air conditioning units, ventilation controls, fans, dehumidifiers or the like. Twelve volt D.C. power is provided on power terminal VS by a suitable power supply circuit 104 having a pair of leads 106 for connection with an A.C. power source, and a transformer 108, rectifier 110, a capacitor 112 and a transistor 114 for producing a regulated D.C. voltage therefrom.

Figure 3:
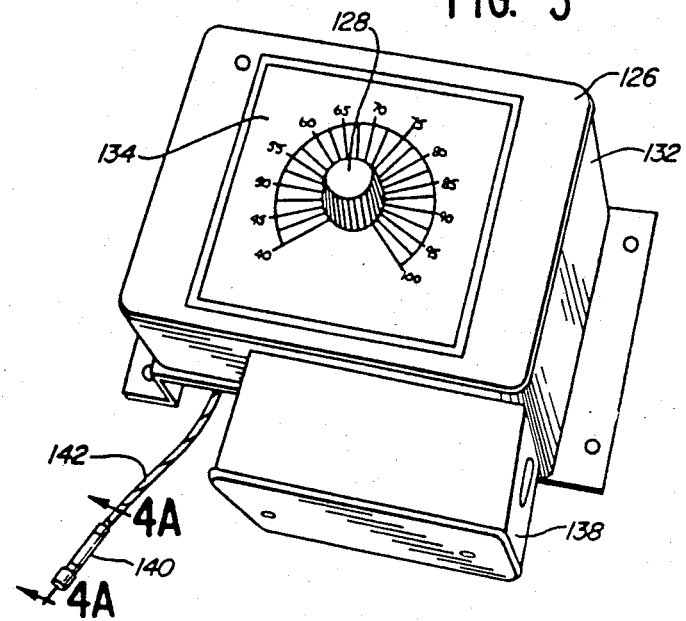
FIG. 3 is a perspective view of the electronic thermostat of the preferred embodiment as shown contained within its housing and illustrating the preferred embodiment of the temperature probe used therewith.

Referring now to FIG. 3, the electronic thermostat is seen to include a metal housing 126 within which is mounted the electronic thermostat circuitry of FIGS. 1 and 2. The wiper blade of set point potentiometer 62 is operated by a rotary knob 128 mounted at the center of a linearly graduated temperature scale. The LED 84 and LED 84' are also mounted to the housing 126 opposite transparent lenses 132 and 134, respectively. The power supply circuitry and relay switches 20 and 28 and terminals for making the necessary circuit connections are mounted within a sub-assembly housing 138 which is attached to housing 132. The sensor element is preferably mounted within a protective tube 140 and is connected to the remaining circuitry by an elongate coaxial cable 142.

Figure 4A:
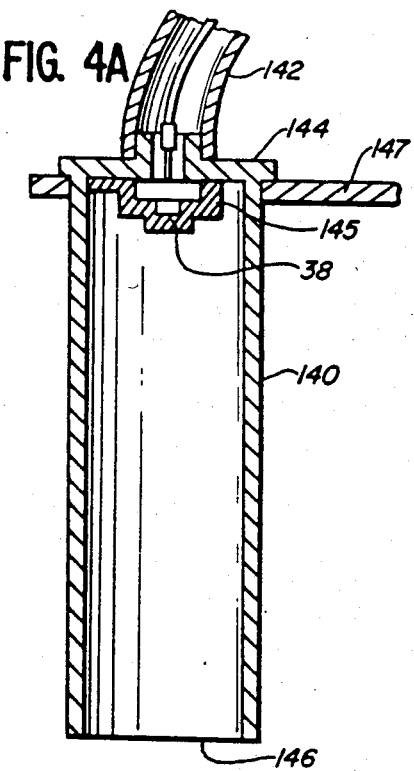
FIGS. 4a and 4d are cross-sectional views of different embodiments of the temperature probe of the electronic thermostat.

Referring to FIG. 4A, in one embodiment of the sensor probe, the tube 140 is formed of stainless steel, hard plastic or the like. It is painted black, so that it interacts with its environment as a thermal black body radiating heat to the sensor element 38. The sensor element 38 is mounted adjacent the closed, or connection, end 144 and is protectively sealed with a thin layer 145 of epoxy or the like. The tube is mounted to a ceiling, wall or other structure by means of a bracket 147 with its open end 146 pointing downwardly, so that it responds only to vertically directed heat waves. The sensor element 38 is set back several inches from the open end 146 also for the reason that it is protected from drafts which might cause it to respond to transient, localized temperature changes.

Figure 4B:
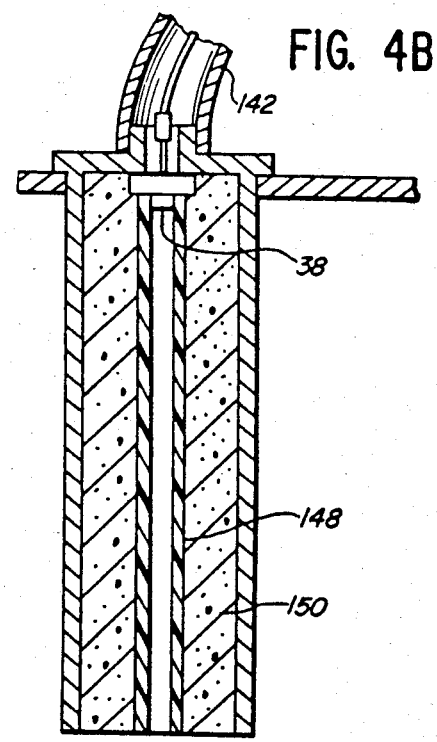

Referring to FIG. 4B, another embodiment of the sensor probe is shown in which the sensor element 38 is encased in another steel or plastic tube 148 by means of a thermally conductive cement 150 or the like. With the sensor element 38 located adjacent the end of the tube opposite the cable 142, this probe has been found to provide a much faster thermal response than of the probe of FIG. 4A.

It should be appreciated that while a particular embodiment has been disclosed, the invention for which protection is not so limited, but rather is defined by the claims. Many variations will be obvious to the skilled person of the electronic thermostat art without departing from the scope of the invention. For instance, although the circuitry has been previously illustrated with three stages for each cycle, embodiments with more than three cycles are generally disclosed and contemplated. Also, the relays and loads associated therewith may be connected in any number of combinations that are useful and not necessarily as shown.

We claim:

1. An electronic thermostat for controlling both cooling and heating apparatus, comprising:
   means for sensing the temperature;
   means for controlling the heating apparatus in response to the temperature sensing means including primary means for actuating the heating apparatus in response to the sensed temperature decreasing below a preselected set temperature, said heat apparatus actuating means causing continuous actuation of the heating apparatus and including a primary actuating means responsive to the set temperature, and a separate override actuating means responsive to said sensed temperature decreasing below a heat override temperature which is less than said set temperature by a preselected increment to actuate the heating apparatus independently of actuation thereof by said primary means;
   means for deactuating the heating apparatus in response to the sensed temperature rinsing to a heat deactuating temperature slightly greater than said set temperature to establish a hysteresis characteristic in the actuation and deactuation of the heating apparatus; and
   means for controlling the cooling apparatus in response to said temperature sensing means including
      means for actuating the cooling apparatus in response to the sensed temperature rising to a cool actuation temperature greater than said heat deactuation temperature to establish a preselected dead zone between heating and cooling cycles, and
      means for deactuating the cooling apparatus when the second temperature decreases to a preselected cool deactuation temperature which is slightly less than said cool actuation temperature to establish a hysteresis characteristic in the actuation and deactuation of the cooling apparatus; and
      means for selectively varying the temperature increment between said set temperature and said cool actuation temperature to alter said dead zone.

2. The electronic thermostat of claim 1 including means for selectively varying the temperature increment between said set temperature and said cool actuation temperature to alter said dead zone.

3. The electronic thermostat of claim 1 in which each of said deactuating means includes a feedback circuit for introducing a hysteresis characteristic to its associated actuating means.

4. The electronic thermostat of claim 1 in which said cooling apparatus actuating means causes continuous actuation of the cooling apparatus and includes
   a primary actuating means responsive to the cool actuation temperature, and
   a separate override actuating means responsive to said sensed temperature increasing above a cool override temperature which is greater than said cool actuation temperature by a preselected increment to actuate the cooling apparatus independently of actuation thereof by said primary means.

5. The electronic thermostat of claim 1 in which said dead zone altering means includes a manually variable resister for changing one of the set temperatures and the cool actuation temperature.

* * * * *

UNITED STATES PATENT AND TRADEMARK OFFICE
CERTIFICATE OF CORRECTION

PATENT NO. : 4,638,850
DATED : Jan. 27, 1987
INVENTOR(S) : Alfred T. Newell III and E. Lane Nichols It is certified that error appears in the above-identified patent and that said Letters Patent is hereby corrected as shown below:

Col. 1, line 26, delete "at";

Col. 1, line 54, change "Huges" to - Hughes -;

Col. 4, line 9, after "is" insert - a -;

Col. 4, line 18, change "4d" to - 4b -;

Col. 5, lines 2 and 3, change "approximatel" to
  - approximately -;

Col. 5, line 13, after "DHO'." insert - The cool cycle has a
  primary cool stage which is activated when a -;

Col. 5, line 13, delete "The";

Col. 6, line 62, change "senondary" to - secondary -;

Col. 12, line 9, change "rinsing" to - rising -; and

Col. 12, line 24, change "second" to - sensed -.

Signed and Sealed this

Twenty-third Day of February, 1988

Attest:

DONALD J. QUIGG

*Attesting Officer*  *Commissioner of Patents and Trademarks*